Figure 5:
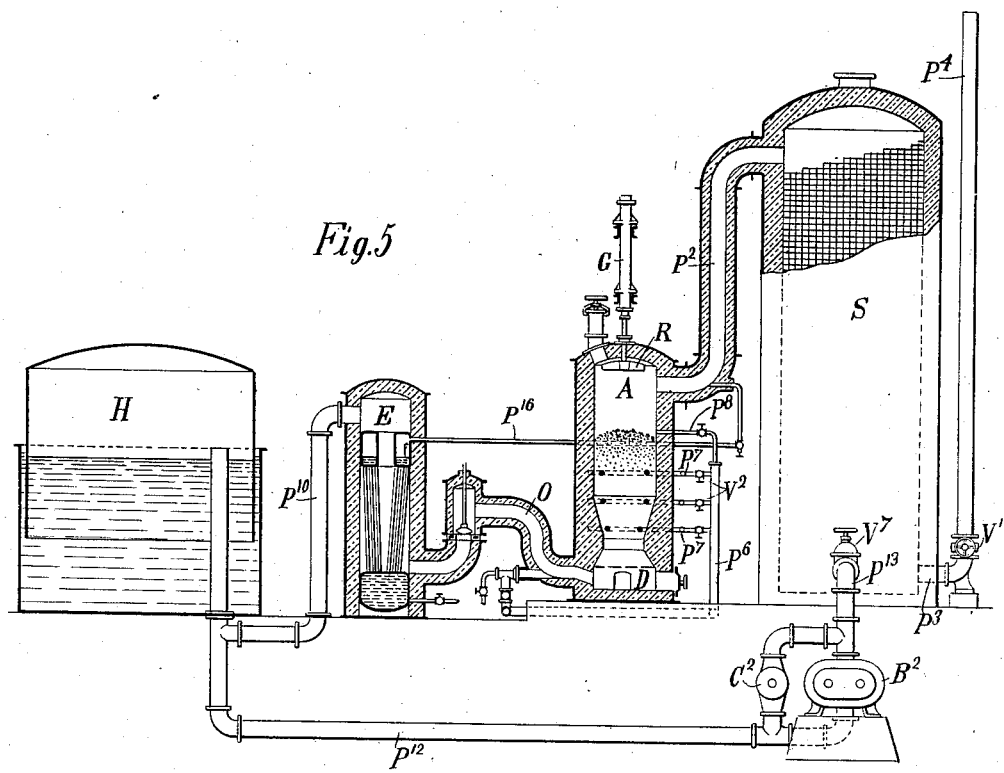

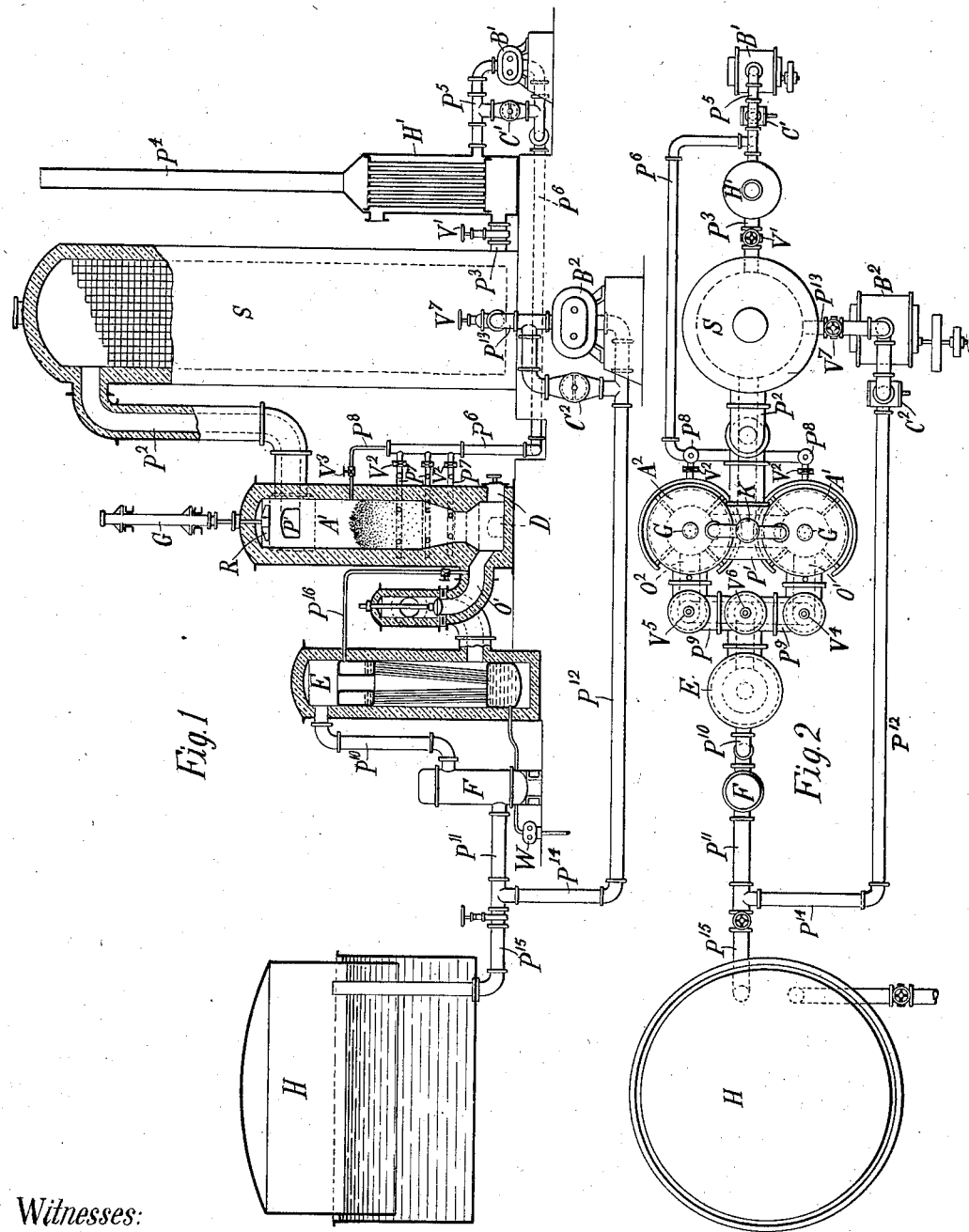

No. 742,412. PATENTED OCT. 27, 1903.
A. M. GOW.
METHOD OF MANUFACTURING GAS.
APPLICATION FILED JAN. 11, 1901.
NO MODEL. 3 SHEETS—SHEET 2.
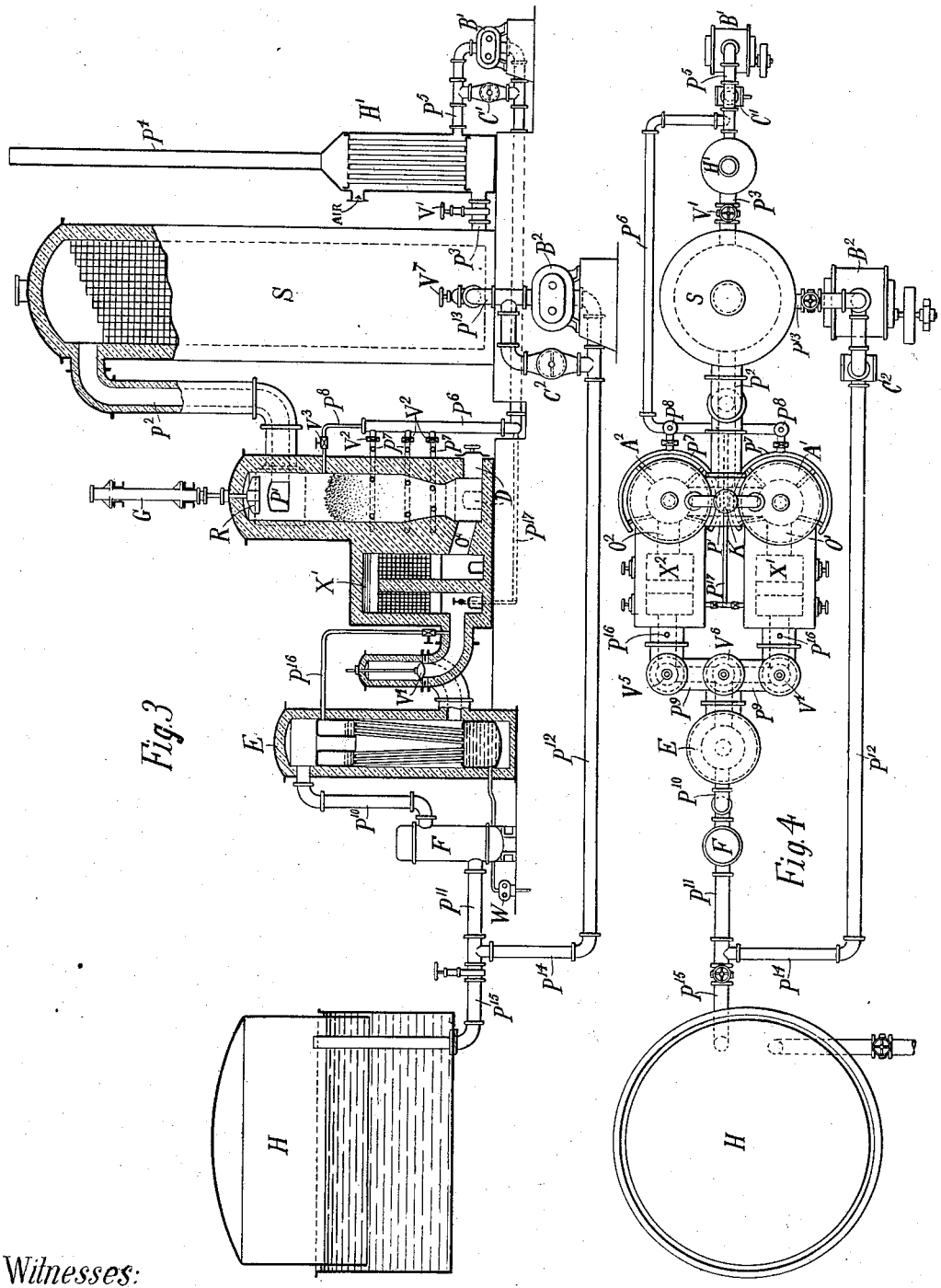

No. 742,412. PATENTED OCT. 27, 1903.
A. M. GOW.
METHOD OF MANUFACTURING GAS.
APPLICATION FILED JAN. 11, 1901.
NO MODEL. 3 SHEETS—SHEET 3.

No. 742,412. Patented October 27, 1903.

UNITED STATES PATENT OFFICE.

ALEXANDER M. GOW, OF PITTSBURG, PENNSYLVANIA, ASSIGNOR TO GEORGE WESTINGHOUSE, OF PITTSBURG, PENNSYLVANIA.

METHOD OF MANUFACTURING GAS.

SPECIFICATION forming part of Letters Patent No. 742,412, dated October 27, 1903.

Application filed January 11, 1901. Serial No. 42,840. (No specimens.)

*To all whom it may concern:*

Be it known that I, ALEXANDER M. GOW, a citizen of the United States, and a resident of Pittsburg, in the county of Allegheny and State of Pennsylvania, have invented certain new and useful Improvements in Methods of Manufacturing Gas, of which the following is a specification.

The object of my invention is to provide an economical method for the conversion of any carbonaceous material, but preferably bituminous coal, into gas, and in this specification the word "coal" is used to mean any material containing carbon and volatile matter and includes lignite, peat, wood, garbage, &c.

The accompanying drawings, which form part of this specification, have special reference to the use of soft coal; but the principles involved in the operation of the plant and the method of making gas are applicable to the use of any carbonaceous material.

In this specification the term "producer-gas" will be used to designate gas made by the incomplete combustion of carbon with the oxygen of the air with or without the presence of steam, the term "water-gas" to designate gas made by the decomposition of steam in the presence of incandescent carbon, and "distilled gas" to designate the gas resulting from the distillation of the volatile portion of any carbonaceous material. In the making of water-gas it is evident the particles of carbon cannot become incandescent until the volatile matter in the substance has been driven off. For instance, a particle of coke containing moisture could not become incandescent until the moisture had been expelled. Bituminous coal contains a large percentage of volatile matter of high calorific value. To make water-gas from such material, therefore, two operations must be performed—the coal must be reduced to coke by driving off the volatile matter by the application of heat, then the coke converted into water-gas by the application of heat in the presence of steam. Each of these three types of gas has its own characteristics, which render it peculiarly well adapted to certain uses; and the purpose of this invention is to provide an apparatus which shall have such a wide range of operation that these three gases may be made in determinable quantities and mixed together in such proportions as may be best adapted for the special purpose for which gas is desired. At the same time the provision for the conservation of heat is such that the process is an extremely economical one.

The accompanying drawings show a plant arranged for the use of pulverulent coal and the fuel-bed poked by a reciprocating rammer. I do not limit myself to this construction. The nature of the fuel in any given case would determine the best manner of feeding and poking.

Figure 6:
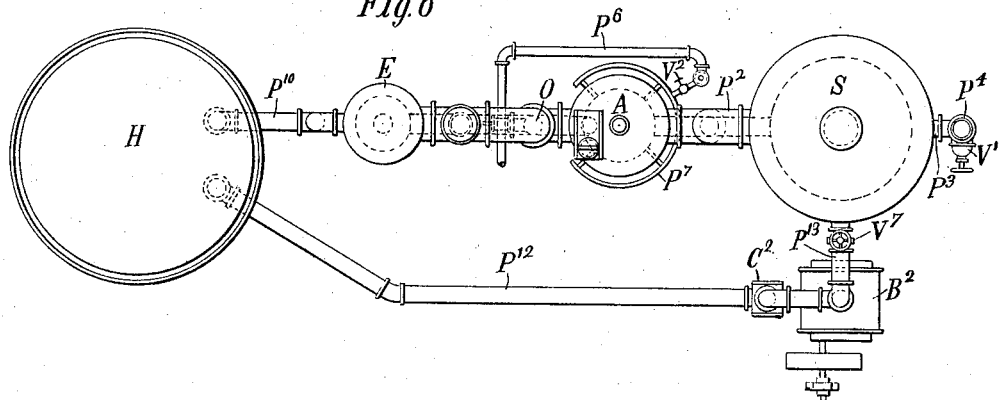

Referring now to the drawings, Figure 1 shows the apparatus partly in elevation and partly in section. Fig. 2 shows the apparatus in plan. Figs. 3 and 4 illustrate a modification introducing checker-chambers for avoiding the production of an excess of steam. Figs. 5 and 6 illustrate a simplified organization of apparatus.

$A'$ and $A^2$ are two gas producers constructed in the usual manner connected near their tops by a passage-way or pipe $P'$.

S is a stove or chamber filled with refractory material, preferably fire-brick, for the storage of heat. Stove S is connected by pipe $P^2$ to pipe $P'$, and thus to the producers. A pipe $P^3$, provided with a valve $V'$, connects the stove to the air-heater $H'$, having an escape-pipe $P^4$. A blower or fan $B'$ is connected to the air-heater by the inlet-pipe $P^5$ and to the producers $A'$ and $A^2$ by the discharge-pipe $P^6$. Discharge-pipe $P^6$ is connected to each producer by three pipes $P^7$, encircling the producers and having valves $V^2$ interposed between the pipes $P^7$ and the discharge-pipe $P^6$. An additional air-pipe $P^8$ is located on each producer, each pipe provided with valve $V^3$, discharging air above the fuel-bed.

On the bottom of each producer $A'$ and $A^2$ are located outlets $O'$ and $O^2$, provided with valves $V^4$ and $V^5$, connecting into pipe $P^9$. Valve $V^6$ is interposed between pipe $P^9$ and a steam-boiler E. These valves $V^4$, $V^5$, and $V^6$ are preferably water-cooled and of the "mushroom" type. Steam-boiler E is connected to a feed-water heater F by pipe $P^{10}$. Pipes $P^{11}$ and $P^{15}$ connect a gas-holder H with the feed-water heater F. The feed-water heater and boiler are equipped with the usual feed-pump W and necessary piping. A blower or fan $B^2$ has its inlet side connected to the holder through pipes $P^{12}$, $P^{14}$, and $P^{15}$ and its outlet to the stove S by pipe $P^{13}$, having located upon it valve $V^7$. Blowers $B'$ and $B^2$ are provided with a by-pass or "churn" valve $C'$ and $C^2$, respectively. The blowers may be driven by any convenient means. On top of each producer is located a rammer or chopper R, operated by means of a hydraulic cylinder G for the purpose of agitating the fuel-bed. If desirable, the rammer may be water-cooled. A coal-hopper K is so located above the producers that coal may be fed into either producer at the will of the operator. Cleaning-doors D D are provided at the bottom of each producer for the removal of clinkers and ash.

To start up from a cold apparatus, the operation is as follows: A wood fire is put into the producers, and they are then charged with coke to a convenient depth. The valves $V^4$, $V^5$, and $V^6$ are closed. Valves $V'$ $V^2$ $V^3$ are open. Blower $B'$ is started and air blown into the producers through pipe $P^6$ and pipes $P^7$. The resulting producer-gas is consumed in the producer above the fuel-bed by admission of air through pipe $P^8$. The resulting products of combustion pass through pipe $P^2$ into stove S, where their sensible heat is absorbed by the fire-brick. They pass downward through the stove S, through pipe $P^3$, air-heater $H'$, and pipe $P^4$ into the atmosphere. Air at the same time is being drawn by the blower $B'$ through the air-heater, picking up heat from the waste gases not absorbed by the stove. This blasting-up operation is continued until the coke is blown to incandescence and a large amount of heat stored in the stoves. The blower $B'$ is now stopped and valves $V'$ and $V^2$ closed and the valves $V^5$, $V^6$, and $V^7$ are opened and the blower $B^2$ is started. The system is now full of air and products of combustion. The blower $B^2$ serves to cause a circulation of the gases in the system. Circulation proceeds from the blower $B^2$ through the stove, where the circulating gases become intensely heated. They pass down pipe $P^2$ into producer $A^2$, downward through the hot fuel-bed, through outlet $O^2$, pipe $P^9$, and steam-boiler E, where they raise steam. As soon as steam is raised it is permitted to escape by pipe $P^{16}$ into the producer $A'$, which contains incandescent coke. Water-gas is immediately made. It passes up through the fuel-bed in producer $A'$ to the connection $P'$ and joins the strand of gas that the blower is circulating. Ground coal of suitable fineness is now fed from the hopper K into producer $A^2$. It falls into the intensely-hot strand coming from the stove. The result is that each particle of coal is almost instantly converted into coke. The volatile gases resulting from this coking action augment the volume of the circulating gases and pass downward through the fuel-bed of producer $A^2$. In the fuel-bed the heavy hydrocarbons are broken into lower forms—that is to say, the tar and vapors are converted into hydrogen $CH_4$ and free carbon. A certain percentage of $CH_4$ will also be broken up into carbon and hydrogen, the amount so broken up depending upon the temperature and depth of the fuel-bed. The resulting gas passing out at the bottom of producer $A^2$ will be therefore a mixed gas, containing all the volatile matter of the coal, the water-gas produced by the steam in producer $A'$, and the circulating strand. As the volume of gas in the system increases the holder rises. When the temperature of the producer $A'$ is reduced below the point for the economical making of water-gas, the steam is shut off and the valve $V^4$ is opened and $V^5$ closed. Producer $A^2$ is still hot from the blasting up, inasmuch as the heat for the distillation of coal was supplied from the stove. Steam is now turned into producer $A^2$ and coal is fed into producer $A'$ and distilled therein by heat brought from the stove by the strand. When the gas-making operations have been carried on for such a length of time that the temperature of both producers is reduced below the point of economical working, the steam is shut off, the blower stopped, and coal-feeding is stopped and the valves $V^4$ and $V^6$ are closed. The stove is now full of gas, which it is desirable to save. The by-pass valve $C^2$ on blower $B^2$ is opened and the fan started. Producer-gas thus made pushes the water-gas ahead of it, and when in the judgment of the operator the stove has been practically freed of its content of water-gas valve $V'$ is opened and valve $V^7$ closed. The two producers are now blown to incandescence and the stove reheated as before.

The operation of the by-pass valve $C^2$ is to control the amount of circulation. The blower is a positive blower and for each revolution carries around a definite volume of gas. If the valve $C^2$ is opened, the blower will produce no circulation in the pipe $P^{12}$ nor pressure in the pipe $P^{13}$. If, however, the valve $C^2$ is partially closed, then a partial circulation will be established along the pipes leading to and from the blower, and if the valve be entirely closed then the entire volume displaced by the blower at each revolution will be forced out along $P^{13}$ and drawn in at $P^{12}$. The valve $C^2$ thus serves a very important function, as it enables the operator at all times to control the circulation, increasing it or decreasing it at will. It will be understood, however, that it controls only the gases in the system and not air from outside the system. Air for heating the producers is furnished by the other blower $B'$.

It will be seen from the foregoing that all the manipulations can be performed with entire safety.

The above method of procedure constitutes the operations involved in the manufacture of a gas which is a mixture of water-gas and distilled gas and is, with the exception of the small percentage of $CO_2$ contained, all combustible. For certain purposes it might be desirable to obtain from a given weight of coal a larger volume of gas of lower calorific value. In such case simultaneously with the injection of steam into the incandescent-fuel bed air from the blower B' is admitted to the producer. The resulting gas would be a mixture of producer-gas, water-gas, and distilled gas. Its calorific power would be reduced by the nitrogen present incident to the manufacture of producer-gas, and the amount of nitrogen present would be relative to the amount of producer-gas made.

From the foregoing it will be seen that the method and apparatus constitute means whereby soft coal may be converted into gas of any desired calorific value from producer-gas to water-gas and at the same time the volatile matter of the coal converted into fixed gas and added to the volume of other gases made.

It has been found in practice that when using fine bituminous coal the character of the fuel-bed will be determined by the amount of coking to which the particles of coal are subjected—that is to say, if the amount of heat carried from the stove into the producer be very large relative to the amount of coal fed the particles of coal will be completely coked, and the resulting fuel-bed will be composed of fine granular and free flocculent carbon. If the feed of coal be increased, the strand remaining the same, the coking operation will not be so complete, and the particles of coke will adhere to each other, forming lumps of light porous spongy coke. It lies within the power of the operator, therefore, to control the character of the fuel-bed. The volume of gas carrying the heat necessary for the distillation of a given weight of fuel charged will depend on the amount of the volatile matter contained. For instance, to drive off in the same unit of time the gases from a coal containing fifty per cent. volatile matter will require a larger volume of gas than required in the case of a coal containing but twenty-five per cent. volatile. If, therefore, the heat carried to the boiler in the second case were just sufficient to raise the amount of steam needed for the operation of the plant, there would be an excess of steam in the first case. To avoid the loss due to the raising of an excess of steam, the organization shown in Figs. 3 and 4 may be employed. In these figures the same general organization as described in Figs. 1 and 2 is shown, with the addition of checker-chambers X' and $X^2$ placed between the producers and the boiler. These chambers are filled with fire-brick in the usual manner. The brick absorb a portion of the sensible heat of the gas volume passing through one producer to the boiler, reducing its temperature, and consequently reducing the amount of steam raised. At the same time the checker-chamber on the other producer acts as a steam-superheater for the volume of steam passing into the producer for the water-gas reaction.

It has been noted before that the breaking up of the tar and heavy hydrocarbon vapors causes a greater or less deposit of free flocculent carbon. Some of this carbon will be carried through the fuel-bed by the current of gas. The gas also will carry some fine ash. The checker-chambers X' and $X^2$, in addition to acting as conservators of heat, will serve to remove a certain amount of this fine carbon and ash. They therefore act as dust-collectors and are provided with doors for cleaning. Provision is also made by means of air-pipe $p^{17}$ from the blower B' for the burning out of an accumulation of carbon. This connection also serves to supply superheated air for the blowing up of the producers if in any case it should prove desirable so to do.

In Figs. 5 and 6 there is shown a simplified organization of apparatus. Only one gas-producer A is employed. The top of this is connected by the pipe $P^2$ with the top of the stove S. The latter is connected by a pipe $P^3$ with the escape-pipe $P^4$. The pipes $P^7$ encircle the producer A as before. The air-heater, feed-water heater, and checker-chambers are left off. Steam is admitted above the fuel-bed and water-gas made downward. Its sensible heat therefore does not assist in the volatilization of the fresh charge of fuel. In addition the water-gas is not made simultaneously with the distilled gas, as in the case of the two-producer organization. (Shown on Figs. 1, 2, 3, and 4.) Consequently the output of gas in a unit of time would be less than in the organization where two fuel-bodies are operated upon simultaneously. In addition, the water-gas being made downward, it passes off at the bottom of the producer, where the heat is more intense than at the top of the fuel-bed. Another important advantage of the simultaneous steaming and circulating is that steam is raised in the boiler at the same time that it is used for the water-gas reaction. It is obvious that unless the application of heat to the boiler is simultaneous with the use of the steam produced there will be a constant variation of steam-pressure. The use of two producers is therefore very desirable from the standpoint of output, economy, and convenience of working. The remaining features of this organization will be readily understood from the description already given of the other figures.

Among some of the advantageous features of my invention may be mentioned the following: The gas-holder forms a part of the system, and therefore the entire system is at all times under holder pressure, so that there is no liability of a vacuum or a leakage of air in any portion into the apparatus. No valve is required to separate the gas made from the circulating gas. The stove is used for conserving the waste heat passing out from the producer at the time of blowing up and is not used to store heat for the water-gas reaction, but only the heat necessary for the distillation of fresh charges of coal and raising steam. It therefore need not be as large as would be required in case it were used for a storage of heat for a long water-gas run. Inasmuch as the blower takes gas from the holder, the cold end of the stove is not liable to become hot. The volume of gas passing from the producer to the stove to heat the stove is less than the volume passing in the reverse direction. Therefore the convection of heat from the cold end to the hot end of the stove is greater than from the hot to the cold end. Inasmuch as no oxygen passes down through the fire-bed, there can be no ash formed on top of the fire, but the ash and clinker will be at the bottom of the producer and may be removed in the usual manner. Water-gas is made in a producer in which there can be maintained an atmosphere of steam, so that the interstices in the incandescent fuel-bed will be completely filled with steam and the consequent comparatively slow velocity of the steam through the fuel-bed will permit the time element to enter as a factor in the decomposition. The heat of convection of the water-gas assists in distillation of coal, the gas coming off from the producer at a high temperature mixed with the strand of gas coming from the stove augmenting the volume and the heat carried. The steam necessary for the water-gas reaction and for operating the plant is raised in a steam-boiler, the heat being supplied by the circulating strand of gas, and in quantity it is entirely under the control of the operator. If an excess of steam at any time is made, fuel may be fed faster or the circulating strand may be decreased in volume. In case there is a deficiency of steam the opposite course may be pursued. The hydrocarbons and the distilled gas, the tar, &c., resulting from the distillation of the fresh charge are broken up by passing upward through the hot fuel-bed into hydrogen and carbon. The free flocculent carbon to a greater or less extent will be deposited in the fuel-bed, and while some portion may be carried on with the gas through the boiler into the holder there can be no deposit of carbon in the stove. When the free flocculent carbon is deposited in the fuel-bed, it may have a tendency to pack and decrease the resistance offered to the circulation, but a blast applied to the bottom of the producer causes this carbon to be consumed and at the same time the upward action of the blast tends to loosen the fuel-bed. The blasting operation being always upward, the blast and pressure need not be excessively high. The amount of work to be done in forcing the circulation is comparatively small, inasmuch as the circulating strand passes through but one fuel-bed, and in volume it need be sufficient only to carry the heat requisite for the distillation of the coal and for raising steam. The water-gas requires a much larger amount of heat than is used in the process of distillation. This process therefore contemplates the use of a smaller strand than would be required were the heat for all the reactions to be carried by the circulating strand. The only heat-valves required are those located between the producers and the boiler, no valves being required between the producers and the stove. In fact, the producers may be regarded as outside combustion-chambers of the stove. It is not required to admit air into the volume of gas, air being admitted only into the fuel-bed. Therefore the danger of an explosion is practically eliminated, the entire system being at all times under pressure, as already stated. The efficiency of the entire apparatus is not dependent upon the efficiency of the stove. A long water-gas run and consequent large storage of heat as contemplated, wherein the strand supplies heat for the water-gas reaction, is not contemplated by this system. The heat stored is heat which in the usual water-gas practice is either thrown away or used in breaking up some heavy hydrocarbon when it is desired to carburet water-gas. The utilization of this heat for the distillation of coal is a distinct gain over such practice.

In the apparatus described it is contemplated, if required, to use pulverized coal. This provides a loose soft fuel-bed, through which a poker is easily driven, and consequently in place of a stirring device a small reciprocating chopper may be used, which is in the fire only at intervals, and when out of the fuel-bed it may be raised out of the path of the hot gas, and thus the amount of water for cooling and the power for driving it would be relatively small. The coal in the powdered state dropping into the strand of hot circulating gas is converted into coke more quickly than larger pieces, as the coking operation necessarily extends from the surface of the coal inward, and thus it follows that a given quantity of coal can be reduced to coke in a much shorter time when in a powdered condition than when fed in lumps. This time element in coking is a very important one in the production of a given apparatus.

It may be further stated that this method and apparatus when used with coke or anthracite has great advantages, inasmuch, for instance, as the waste heat of blowing up would be economically conserved and then used to heat a fresh charge of fuel and then to add heat to the fuel-body cooled by the water-gas run. It is, however, specially adapted to the use of soft coal.

There are many other advantages which might be enumerated in connection with the apparatus, but those already referred to are some of the more important ones.

In an application filed by me January 5, 1901, Serial No. 42,202, which application forfeited and was renewed August 5, 1903, Serial No. 168,365, I have made claim to the apparatus herein described.

I claim as my invention—

1. The process of making gas which consists of blowing to incandescence a body of fuel in a gas-producer, storing the heat of the waste gases in a stove, then injecting steam into the body of incandescent fuel to make water-gas, then returning the stored heat to the producer for the purpose of distilling the volatile portion of a fresh charge of fuel.

2. The process of making gas which consists of blowing to incandescence a body of fuel, storing the heat of the waste gases in a stove, injecting steam into the body of fuel to produce water-gas, and causing a current of gas already made to proceed from the stove into the producer to carry the heat necessary to drive off the volatile constituents of a fresh charge of fuel.

3. The process of making gas which consists of blowing to incandescence the fuel in two gas-producing chambers, conserving the heat of the gas thus produced in a stove, injecting steam into one producer to make water-gas and simultaneously causing a current of gas already made, to flow through the stove into the other producer to carry the heat necessary to drive off the volatile matter contained in a fresh charge of fuel fed into that producer.

4. The hereinbefore-described method of manufacturing gas which consists in first blowing to incandescence a body of fuel, conserving the heat of the waste products of combustion, then causing steam to enter the incandescent body of fuel thereby producing water-gas, combining the water-gas thus produced with other gas previously made, causing the mixture thus obtained to traverse a fuel-bed thereby distilling therefrom the volatile materials contained therein and storing the resultant gases produced.

5. The hereinbefore-described method of manufacturing gas which consists in first blowing to incandescence a body of fuel, conserving the heat of the waste products of combustion, then causing steam to enter the incandescent body of fuel thereby producing water-gas, combining the water-gas thus produced with other gas previously made, causing the mixture thus obtained to traverse a fuel-bed thereby distilling therefrom the volatile constituents contained therein, then reversing the direction of flow through the two fuel-beds, producing water-gas in the second and distilling volatile constituents from the first-named fuel-bed.

6. The hereinbefore-described method of conserving and utilizing heat generated in the blowing up of fuel-beds for gas-making which consists in storing a greater or less amount of the heat developed during the blowing up of a fuel-bed, producing water-gas by causing the fuel-bed to be supplied with steam, heating generated gas by the stored heat, combining therewith the water-gas produced while in a heated condition, causing the combined gases to generate gas and to simultaneously prepare a second fuel-bed for the production of additional water-gas.

Signed at Pittsburg, in the county of Allegheny and State of Pennsylvania, this 18th day of December, A. D. 1900.

ALEXANDER M. GOW.

Witnesses:
R. J. BRATTON,
J. A. ADAMS.